(12) United States Patent
Kadowaki (10) Patent No.: US 11,143,266 B2
(45) Date of Patent: Oct. 12, 2021

(54) LIQUID-SEALED VIBRATION-DAMPING DEVICE

(71) Applicant: YAMASHITA RUBBER CO., LTD., Saitama (JP)

(72) Inventor: Hirokazu Kadowaki, Saitama (JP)

(73) Assignee: YAMASHITA RUBBER CO., LTD., Fujimino (JP)

(*) Notice: Subject to any disclaimer, the term of this patent is extended or adjusted under 35 U.S.C. 154(b) by 0 days.

(21) Appl. No.: 15/569,762

(22) PCT Filed: Apr. 28, 2016

(86) PCT No.: PCT/JP2016/063382
§ 371 (c)(1),
(2) Date: Oct. 26, 2017

(87) PCT Pub. No.: WO2016/175291
PCT Pub. Date: Nov. 3, 2016

(65) Prior Publication Data
US 2018/0128344 A1    May 10, 2018

(30) Foreign Application Priority Data

Apr. 28, 2015 (JP) .............................. JP2015-092398

(51) Int. Cl.
*F16F 13/10* (2006.01)
*B60K 5/12* (2006.01)

(52) U.S. Cl.
CPC .............. *F16F 13/105* (2013.01); *B60K 5/12* (2013.01); *B60K 5/1208* (2013.01); *F16F 2230/0005* (2013.01); *F16F 2230/38* (2013.01)

(58) Field of Classification Search
CPC ............. F16F 13/105; F16F 2230/0005; F16F 2230/38; B60K 5/1208; B60K 5/12
See application file for complete search history.

(56) References Cited

U.S. PATENT DOCUMENTS 5,667,205 A * 9/1997 Mutoh .................. F16F 13/107
267/140.13
5,967,500 A   10/1999 Satori et al.
(Continued)

FOREIGN PATENT DOCUMENTS

CN    101981342 A    2/2011
CN    202371082 U    8/2012
(Continued)

OTHER PUBLICATIONS

Chinese Office Action issued in corresponding application No. 201680023719.4, dated Nov. 21, 2018.
(Continued)

*Primary Examiner* — Melody M Burch
(74) *Attorney, Agent, or Firm* — Maschoff Brennan (57) ABSTRACT

The present invention provides a liquid-sealed vibration-damping device capable of improving damping performance while preventing increase in size and weight thereof, the liquid-sealed vibration-damping device including: a first attachment member; a second attachment member; an insulator; a vibration-damping unit having a partition member; and a housing space provided in the second attachment member and housing the vibration-damping unit, wherein the second attachment member includes an outer tubular part and a fixing part protruding from the outer tubular part; and a portion of the housing space extends to the fixing part.

3 Claims, 8 Drawing Sheets

(56) References Cited

U.S. PATENT DOCUMENTS

| | | | |
|---|---|---|---|
| 6,386,527 B2 * | 5/2002 | Oberle | F16F 13/103 |
| | | | 267/140.13 |
| 8,894,051 B2 | 11/2014 | Yamamoto et al. | |
| 9,322,451 B2 | 4/2016 | Schumann et al. | |
| 2002/0011700 A1 | 1/2002 | Oberle | |
| 2011/0031663 A1 | 2/2011 | Matsuda | |
| 2011/0101581 A1 | 5/2011 | Kubo et al. | |
| 2012/0292838 A1 * | 11/2012 | Yamamoto | F16F 13/106 |
| | | | 267/140.13 |
| 2012/0299228 A1 | 11/2012 | Matsuda | |
| 2014/0159290 A1 * | 6/2014 | Kojima | F16F 13/18 |
| | | | 267/140.13 |
| 2014/0217661 A1 * | 8/2014 | Schumann | F16F 13/10 |
| | | | 267/140.14 |

FOREIGN PATENT DOCUMENTS

| | | | | |
|---|---|---|---|---|
| CN | 202402554 U | | 8/2012 | |
| JP | 59151644 A | * | 8/1984 | F16F 13/22 |
| JP | 3059662 B2 | | 7/2000 | |
| JP | 2002-115741 A | | 4/2002 | |
| JP | 4716616 B2 | | 1/2003 | |
| JP | 2009-052675 A | | 3/2009 | |
| JP | 2011-144829 A | | 7/2011 | |
| JP | 2011-149492 A | | 8/2011 | |
| JP | 2014031844 A | * | 2/2014 | F16F 13/1463 |
| JP | 2014-525011 A | | 9/2014 | |
| WO | WO-2013007140 A1 | * | 1/2013 | F16F 13/10 |

OTHER PUBLICATIONS

JP Office Action dated Jun. 3, 2019 as received in Application No. 2015-092398.

* cited by examiner

FIG. 8

LIQUID-SEALED VIBRATION-DAMPING DEVICE

TECHNICAL FIELD

The present invention relates to a liquid-sealed vibration-damping device used for an automobile engine mount or the like.

BACKGROUND ART

A conventional liquid-sealed vibration-damping device for the above use is described in Japanese Laid-Open Patent Application No. 2009-52675. This liquid-sealed vibration-damping device accommodates a hydraulic liquid inside an insulator and is partitioned into a primary liquid chamber and a secondary liquid chamber by a partition member. The partition member holds in a center thereof an elastic movable diaphragm between an upper plate and a lower holder, which are vertically separated. The partition member is provided with an orifice passage outside in a radial direction of the elastic movable diaphragm. The elastic movable diaphragm is configured to face the primary liquid chamber through a central upper opening of the upper plate and the secondary liquid chamber through a central lower opening of the lower holder, and configured to absorb an internal pressure fluctuation by elastic deformation caused by hydraulic pressure fluctuation in the primary liquid chamber.

An automobile engine room has been advanced in downsizing, which requires also the liquid-sealed vibration-damping device to be downsized to follow the downsizing of the engine room. Additionally, the liquid-sealed vibration-damping device is required to be improved in vibration-damping performance.

SUMMARY OF INVENTION

Technical Problem

However, obtaining high damping performance in the liquid-sealed vibration-damping device requires enlarging an area of the partition member. For this reason, there is a problem that the liquid-sealed vibration-damping device increases in size and weight.

Object of Invention

The present invention has been provided to solve the above-described problems, and it is an object of the present invention to provide a liquid-sealed vibration-damping device capable of improving the damping performance while preventing an increase in size and weight of the device.

Solution to Problem

A liquid-sealed vibration-damping device according to the present invention for solving the above-described problems comprises: a first attachment member attached to, for example, an engine that is a vibration source; a second attachment member attached to, for example, a vehicle body that is a vibration receiver; and an insulator connecting the first attachment member with the second attachment member. The liquid-sealed vibration-damping device further includes a liquid chamber formed to include an inner space of the insulator, the liquid chamber sealing in hydraulic liquid; and a vibration-damping unit provided with a partition member to partition the liquid chamber into a primary liquid chamber and a secondary liquid chamber; and a housing space provided in the second attachment member and housing the vibration-damping unit. In addition, the liquid-sealed vibration-damping device includes an outer tubular part provided in the second attachment member, the outer tubular part being fixed with the insulator, and a fixing part protruding from the outer tubular part. Some portion of the housing space extends to the fixing part.

The above-described liquid-sealed vibration-damping device can include also the portion extending to the fixing part for housing the vibration-damping unit and thus prevent an increase in size and weight of the device. In addition, the portion of the housing space extending to the fixing part enables, for example, enlarging a volume of an orifice passage and leading to an improvement of the damping performance; and more in addition, enables enlarging an area of an elastic partition member, leading to a more arbitrary setting of spring characteristics of the liquid-sealed vibration-damping device.

Additionally, a center of the vibration-damping unit is shifted from a center of the insulator toward the fixing part. This shifting enables suppressing the vibration-damping unit from protruding at a side opposite to the fixing part by a shifting amount to the fixed portion. This leads to an easier layout of the vibration-damping unit when mounted on a vehicle.

The orifice passage communicating the primary liquid chamber with the secondary liquid chamber is arranged in the portion of the housing space extending to the fixing part. Such an arrangement enables space-efficient arrangement of the orifice passage that requires a relatively large space and thus allows the damping performance to be improved while preventing an increase in size and weight of the device. Therefore, it is possible to improve the damping performance while preventing the device from becoming larger and increasing the weight.

In addition, the portion of the housing space extending to the fixing part is formed to include an area that is outside an outer surface of the outer tubular part. This enables the housing space to be effectively secured.

The present invention enables providing the liquid-sealed vibration-damping device capable of improving the damping performance while preventing an increase in size and weight of the device.

BRIEF DESCRIPTION OF THE DRAWINGS

FIGS. 4A and 4B are views showing the liquid-sealed vibration-damping device.

DESCRIPTION OF EMBODIMENTS

Hereinafter, description is made of embodiments of a liquid-sealed vibration-damping device according to the present invention with reference to the drawings. In the following description, directions referred to as "front and rear", "top and bottom", and "left and right" are based on directions shown in FIG. 1, and do not necessarily agree with a front and rear direction for a vehicle. A vertical direction with respect to the liquid-sealed vibration-damping device is an input direction of a main vibration.

Figure 1:
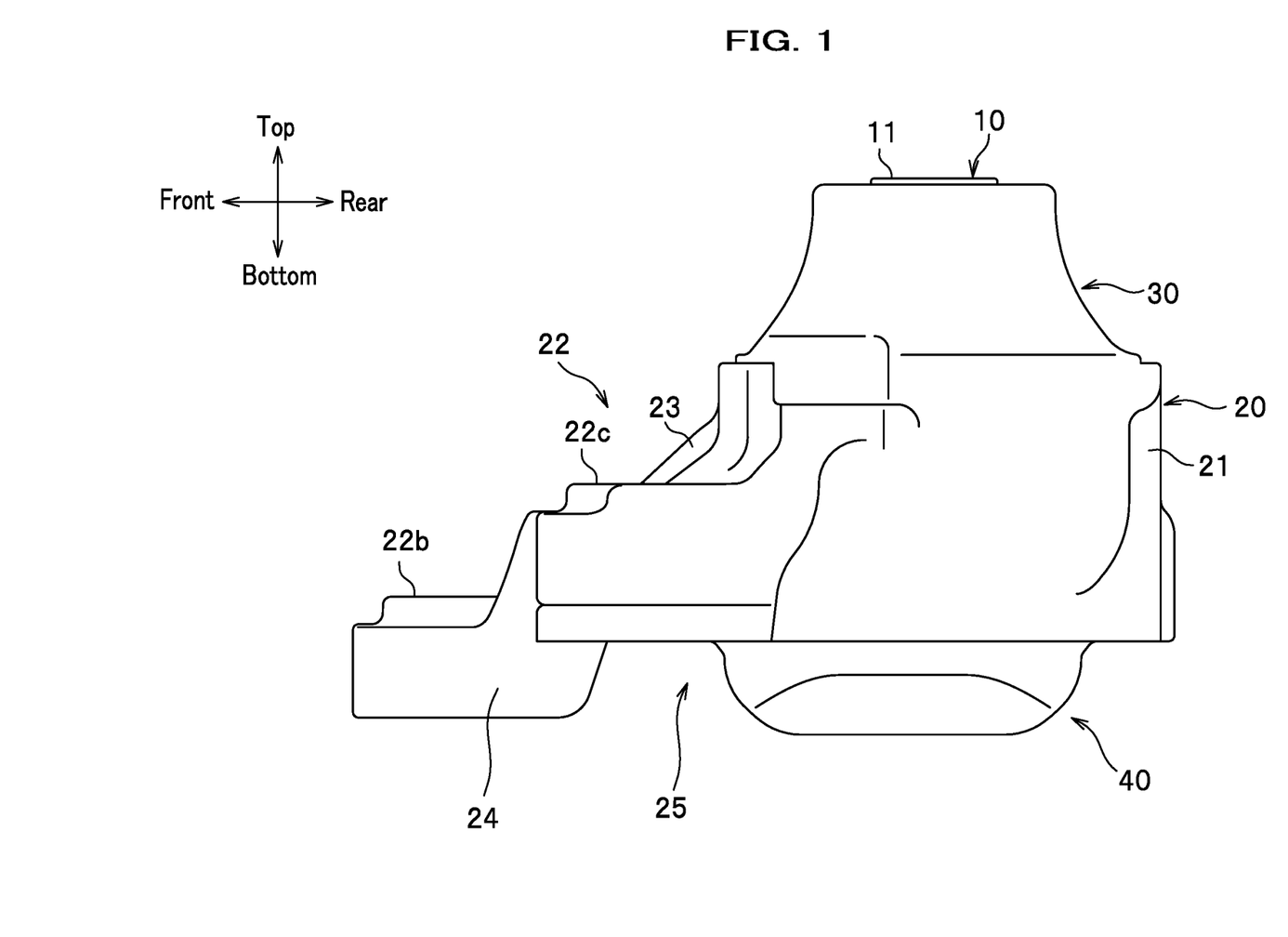
FIG. 1 is a side view showing a liquid-sealed vibration-damping device according to an embodiment of the present invention.
Figure 3:
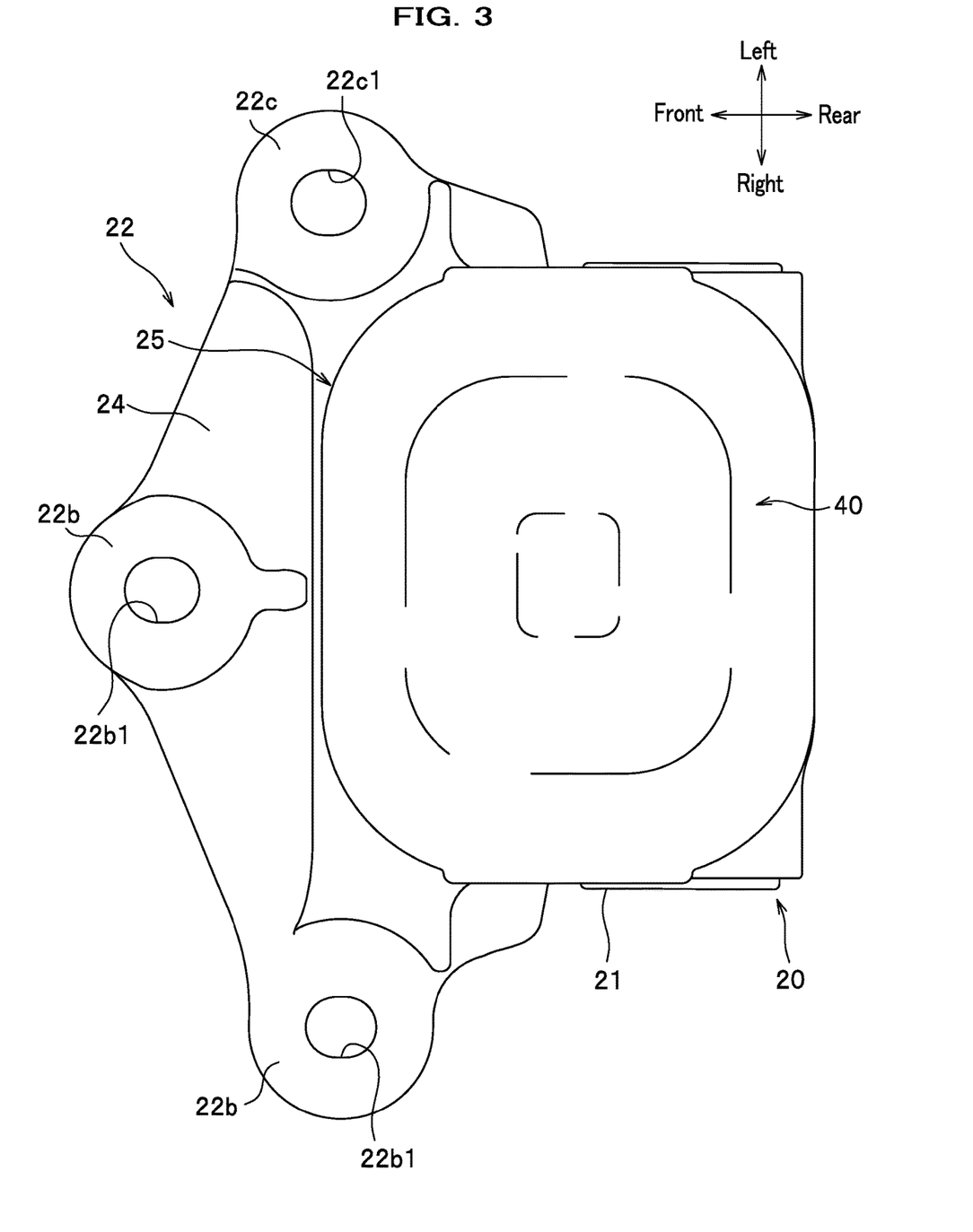
FIG. 3 is a bottom view showing the liquid-sealed vibration-damping device.
Figure 4A:
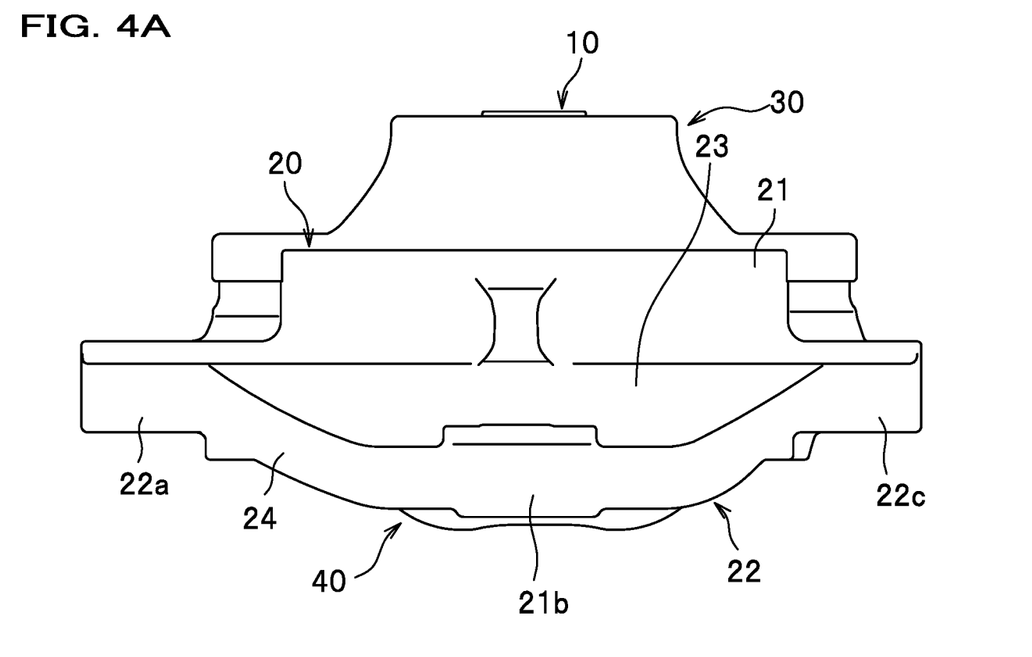
FIG. 4A is a front view.
Figure 4B:
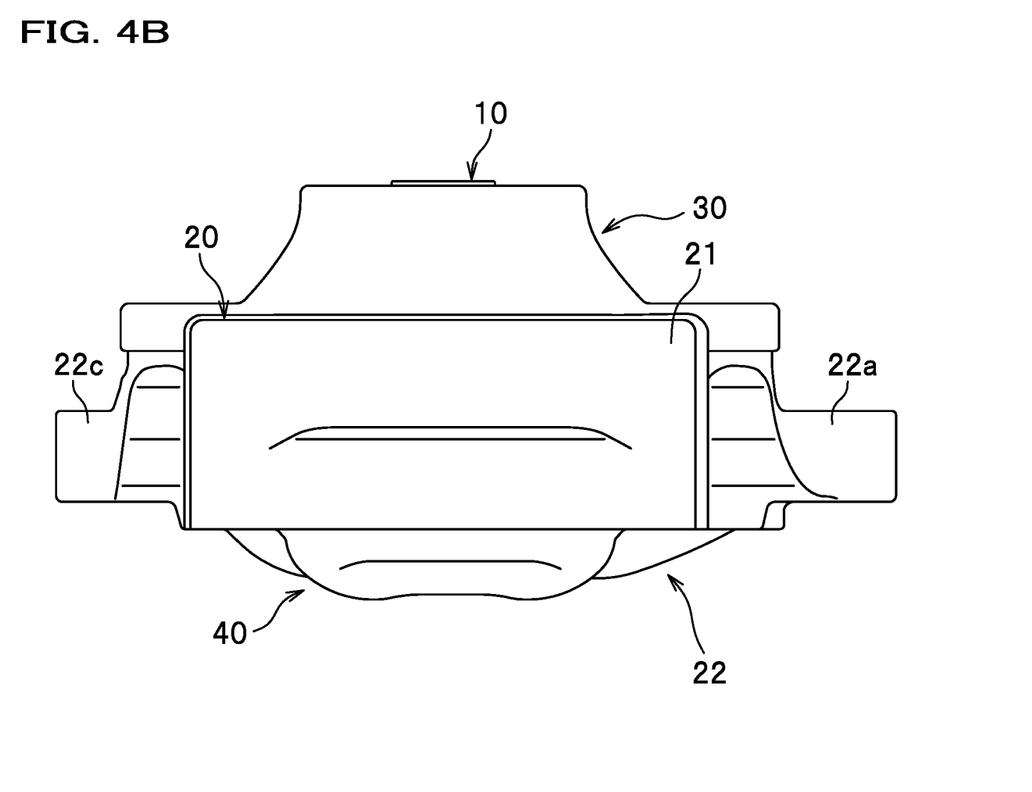
FIG. 4B is a rear view.

A liquid-sealed vibration-damping device is a liquid-sealed type of vibration-damping device disposed between a vibration source and a non vibration-source (vibration receiving part). As shown in FIG. 1, the liquid-sealed vibration-damping device includes a first attachment member 10, a second attachment member 20, and an insulator 30 connecting between the first attachment member 10 and the second attachment member 20. For example, the first attachment member 10 is disposed on or near a vehicle body (not shown) that is a vibration receiving part, and the second attachment member 20 is disposed on or near an engine (not shown) that is a vibration source. On the contrary, the first attachment member 10 may be disposed near the engine and the second attachment member 20 may be disposed near the vehicle body. The second attachment member 20 has a vibration-damping unit 40 attached thereto. As shown in FIG. 3, the vibration-damping unit 40 has a substantially rectangular shape as viewed from the bottom.

Figure 5:
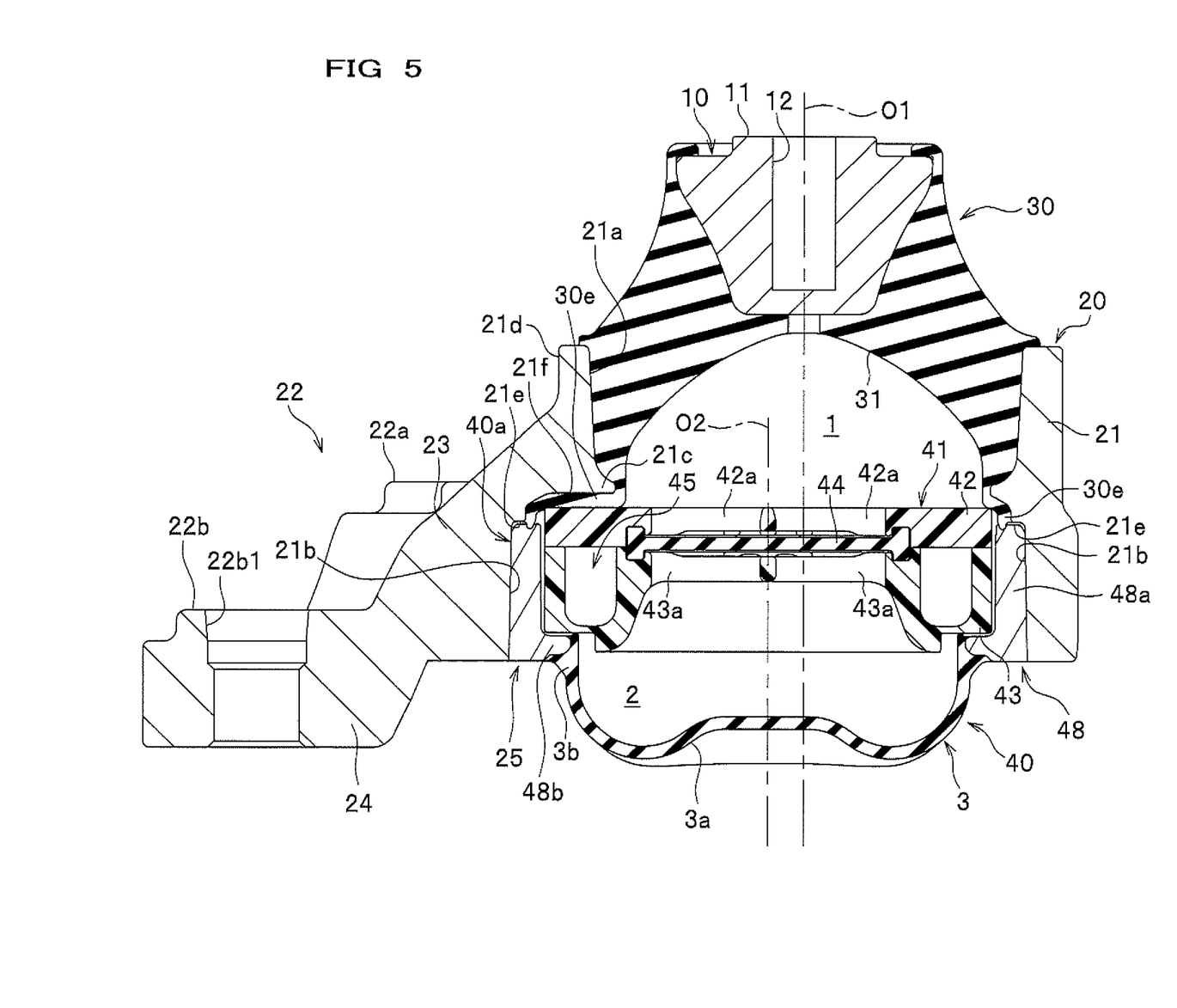
FIG. 5 is a cross-sectional view taken along Line A-A in FIG. 2.
Figure 7:
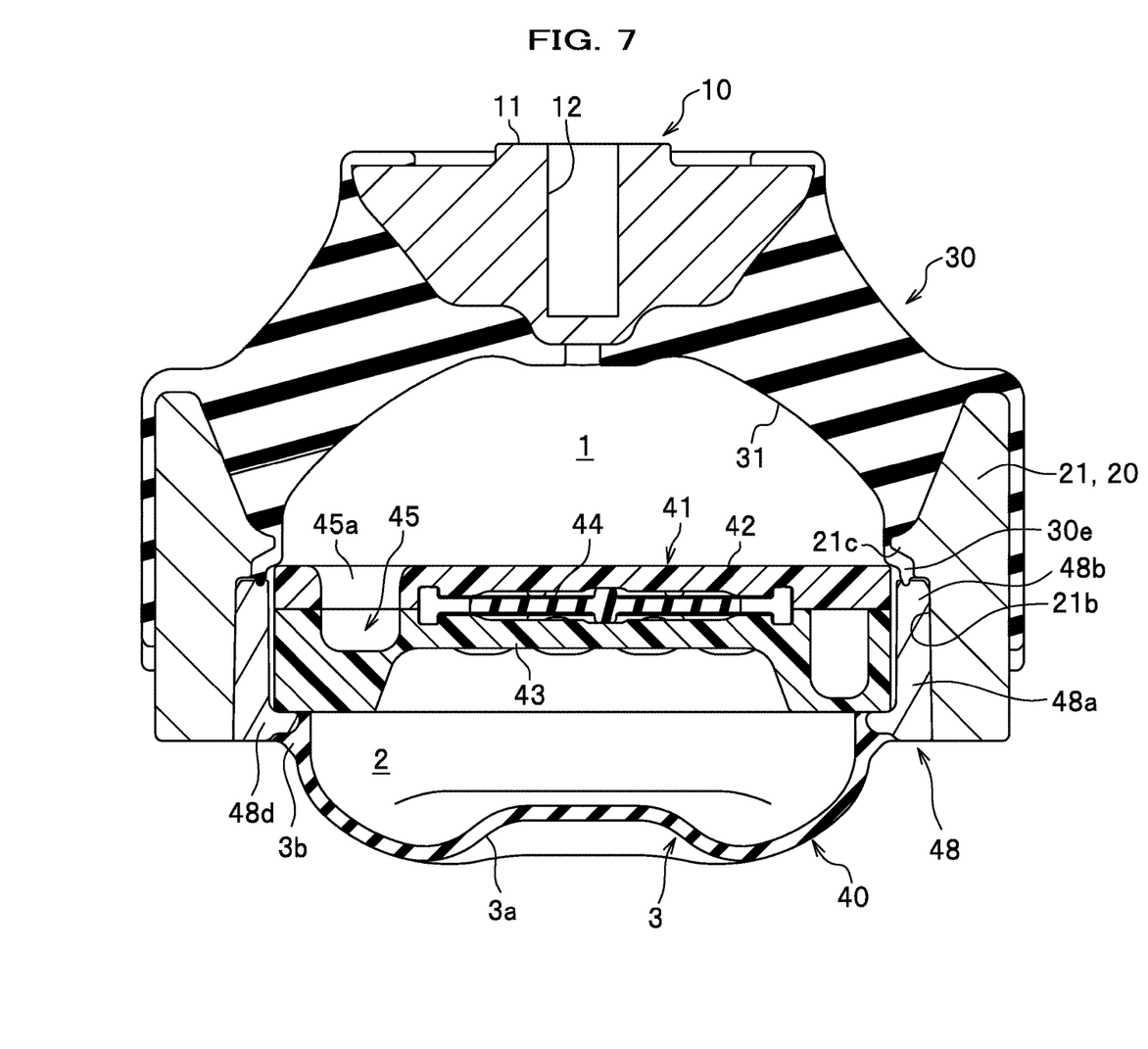
FIG. 7 is a cross-sectional view taken along Line B-B in FIG. 2.

In the embodiment, the first attachment member 10 is a member fixed to or near the vehicle body (vibration receiving side). As shown in FIG. 1, the first attachment member 10 is integrally provided on an upper portion of an insulator 30. As shown in FIGS. 5 and 7, substantially the whole of the first attachment member 10 is embedded in the insulator 30 and vulcanization-adhered to the insulator 30. The first attachment member 10 is made of, for example, aluminum alloy.

The cross sectional shape of the first attachment member 10 is a shape of tapering toward the bottom. The first attachment member 10 includes a flat seat surface 11 exposed from the insulator 30 and a bolt hole 12.

As shown in FIGS. 5 and 7, the insulator 30 has a recess 31. The recess 31 is opened downward in FIGS. 5 and 7 and is defined by a partition member 41 to be a primary liquid chamber 1. An incompressible hydraulic liquid is sealed inside the recess 31. The lower portion of the insulator 30 is fixed to an outer tubular part 21 of the second attachment member 20. An axis O1 passing through a center of the insulator 30 in a normal direction of the above-described seat surface 11 coincides with the central axis of the bolt hole 12 of the first attachment member 10 (central axis of the first attachment member 10).

The vibration-damping unit 40 separates the primary liquid chamber 1 and a secondary liquid chamber 2 using a partition member 41. The primary liquid chamber 1 and the secondary liquid chamber 2 communicate with each other through an orifice passage 45 formed in an outer peripheral portion of the partition member 41. The orifice passage 45 is configured to resonate with, for example, low-frequency vibration. The secondary liquid chamber 2 is formed between a diaphragm 3 and the partition member 41, and utilizes a diaphragm 3 for a part of the wall portion thereof. The vibration-damping unit 40 is attached to the housing space 25.

Figure 6:
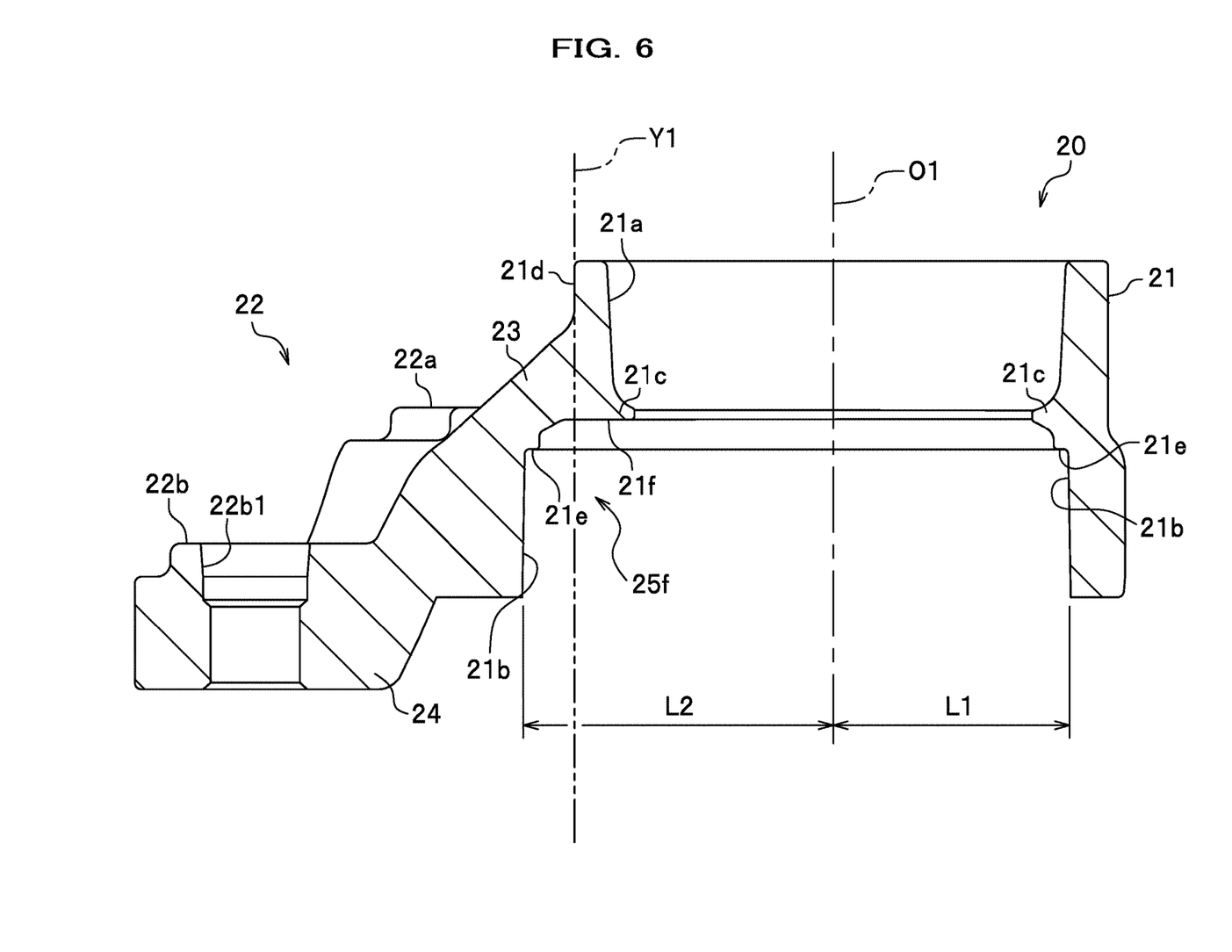
FIG. 6 is a vertically cross-sectional view showing a second attachment member.

The second attachment member 20 in the embodiment is a member fixed to or near the engine (vibration source). As shown in FIGS. 1, 5, and 6, the second attachment member 20 includes the outer tubular part 21 and a fixing part 22 formed integrally with the outer tubular part 21. The vertical line Y1 indicated by a two-dot chain line in FIG. 6 represents an outer surface of the outer tubular part 21, and defines a boundary portion of the fixing part 22. The outer tubular part 21 is formed in a substantially rectangular tubular shape in top view (see FIG. 2). As shown in FIG. 5, the lower portion of the insulator 30 is fixed to an inner surface 21a of an upper portion of the outer tubular part 21. The housing space 25 is formed such as to enter from the outer tubular part 21 into the fixing part 22.

As shown in FIG. 6, a protrusion 21c protruding toward an inside of the outer tubular part 21 is formed at a boundary portion between the inner surfaces 21a and 21b. The protrusion 21c is formed along an entire inner circumference of the outer tubular portion 21. The lower portion of the insulator 30 is appropriately held at the inner surface 21a by the protrusion 21c. A capability for holding the insulator 30 is improved as described above, and thus, a decrease in a spring value can be positively prevented, and a vibration inputted from the engine can be effectively absorbed.

A lower surface portion 21f and a stepped surface 21e are formed between the protrusion 21c and the lower inner surface 21b. As shown in FIG. 5, a lower end portion 30e of the insulator 30 extends downward to a side of the stepped surface 21e, covering the protrusion 21c and the lower surface portion 21f.

A peripheral edge portion of the vibration-damping unit 40 (a peripheral edge portion of the partition member 41 described below) is held on the lower surface portion 21f of the protrusion 21c via the lower end portion 30e of the insulator 30. In other words, the protrusion 21c is a boundary for separating a structure for holding the insulator 30 and a structure for holding the vibration-damping unit 40. Thereby, deformation of the insulator 30 at a time of receiving vibration does not affect the vibration-damping unit 40 to enable preventing a holding position of the vibration-damping unit 40 from changing following the deformation of the insulator 30. This enables the vibration-damping unit 40 to be appropriately positioned and sufficient fluid migration of the hydraulic liquid to be secured. This results in a liquid-sealed vibration-damping device having desired performance.

In addition, the protrusion 21c enables easier assembling of the vibration-damping unit 40. If the vibration-damping unit 40 would be assembled into a structure without the protrusion 21c, the vibration-damping unit 40 would be held only by the lower portion (the lower end portion 30e) of the insulator 30, and there would be a possibility that the vibration-damping unit 40 would be held inclined toward the primary liquid chamber 1 in a case of an inappropriate assembling position. On the contrary, in the present embodiment, the protrusion 21c enables assembling the vibration-damping unit 40 at a predetermined position, while having a rubber reaction force equal to or greater than a certain load, leading to the easier assembling of the vibration-damping unit 40. This contributes to obtaining the desired performance.

Figure 2:
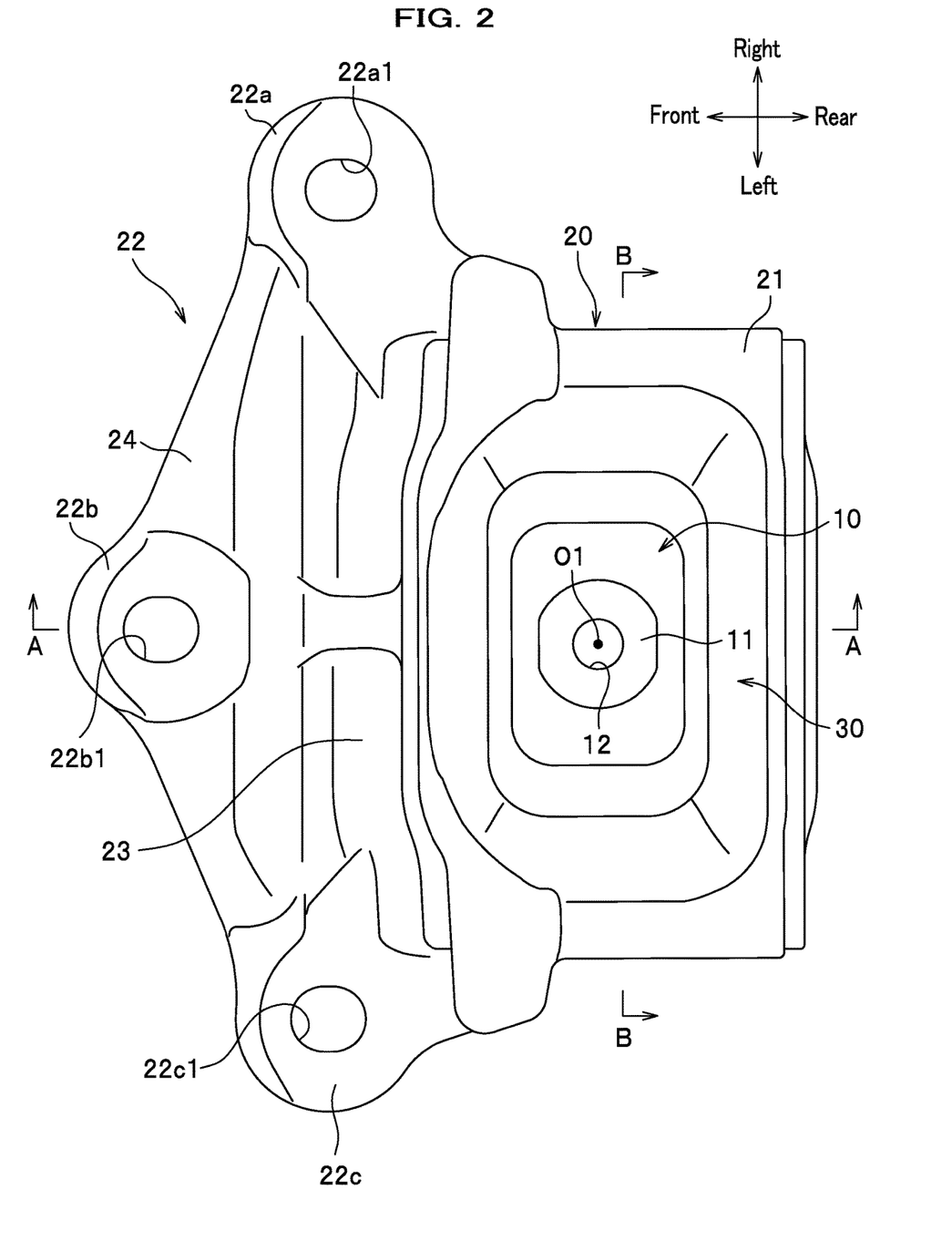
FIG. 2 is a top view showing the liquid-sealed vibration-damping device.

The fixing part 22 is a bracket protruding from the outer tubular part 21 and is disposed at a front of the outer tubular part 21 as shown in FIGS. 5 and 6. As shown in FIG. 2, the fixing part 22 protrudes from one side of the outer tubular part 21.

As shown in FIGS. 5 and 6, the fixing part 22 includes an inclined portion 23 and a flange portion 24 provided continuously to the inclined portion 23. The inclined portion 23 extends forward and downward from an outer surface 21d of the outer tubular part 21.

A part of the housing space 25 described above extends to the fixing part 22. Hereinafter, the part of the housing space 25 that extends to the fixing part 22 is referred to as "housing portion 25f".

As shown in FIG. 6, the housing portion 25f is located at a lower rear side of the inclined portion 23 of the fixing part 22. The housing portion 25f expands a capacity of the housing space 25 by expanding outside (more left side in the figure) than the vertical line Y1 that is defined as a reference line running along or defining the outer surface of the outer tubular part 21 as indicated in FIG. 6, and enters inside the fixing part 22. That is, the housing space 25 is larger than a space determined on a basis of a size of the outer tubular part 21 by an amount expanded by the housing portion 25f. As shown in FIG. 5, the housing portion 25f houses a front portion 40 a of the vibration-damping unit 40.

As shown in FIG. 6, the housing portion 25f is formed by being surrounded by the lower surface portion 21f located under the protrusion 21c and the inner surface 21b continuing from the lower surface portion 21f. The lower surface portion 21f is a surface extending from a protruding edge of the protrusion 21c toward the front. Between the lower surface portion 21f and the inner surface 21b is formed the stepped surface 21e. A front portion of the housing portion 25f is formed to include a region outside the outer surface 21d of the outer tubular part 21 (a region protruding outside the outer surface 21d) in cross-sectional view. That is, the housing portion 25f expands beyond the front portion and the outer surface 21d (vertical wall) of the outer tubular part 21 and enters inside the fixing part 22.

The housing space 25 including the above-described housing portion 25f, as shown in FIG. 6, has a distance L2 from the axis O1 of the insulator 30 to the inner surface 21b of the front side, and the distance L2 is longer than a distance L1 from the axis O1 to the inner surface 21b on the rear side. In other words, the second attachment member 20 has a structure in which the front portion of the housing space 25 provided with the fixing part 22 is larger than the rear portion of the housing space 25.

In the housing portion 25a, the lower end portion 30e of the insulator 30, as shown in FIG. 5, extends forward along the lower surface portion 21f to a side of the stepped surface 21e.

As shown in FIG. 2, the flange portion 24 extends from the inclined portion 23 toward a front direction, and left and right side directions. The flange portion 24 has three bolt-fixing parts 22a, 22b, and 22c for fixing the flange portion 24 to the engine. The bolt-fixing parts 22a, 22b, and 22c are formed with bolt holes 22a1, 22b1, and 22c1 respectively.

Next, description is made of the vibration-damping unit 40, which is arranged to cover the recess 31 of the insulator 30. As shown in FIG. 5, the vibration-damping unit 40 includes the partition member 41 and a frame member 48 holding the partition member 41.

The partition member 41 has a substantially rectangular shape in planar view so as to match the outer shape of the liquid-sealed vibration-damping device shown in FIGS. 2 and 3. The partition member 41, as shown in FIGS. 5 and 7, includes an upper plate 42, a lower holder 43, and an elastic partition member 44. The orifice passage 45 is provided outside the elastic partition member 44.

The upper plate 42 and the lower holder 43 are made of a resin material such as a hard resin, but may be made of light metal such as aluminum alloy. As shown in FIG. 5, the upper plate 42 is formed with a plurality of through holes 42a. The through holes 42a are faced by an upper surface of the elastic partition member 44. This makes the upper surface of the elastic partition member 44 face the primary liquid chamber 1 through the plurality of through holes 42a. A communication hole 45a (see FIG. 7) communicating with the orifice passage 45 is formed in an outer peripheral portion of the upper plate 42.

As shown in FIGS. 5 and 7, the recessed orifice passage 45 is formed in the outer peripheral portion of the lower holder 43. As shown in FIG. 5, a plurality of through holes 43a are formed in an inner portion of the orifice passage 45. The plurality of through holes 43a are faced by a lower surface of the elastic partition member 44. This makes the lower surface of the elastic partition member 44 face the secondary liquid chamber 2 through the plurality of through holes 43a.

The elastic partition member 44 is sandwiched between the upper plate 42 and the lower holder 43. The elastic partition member 44 is made of an elastic member such as rubber and has a substantially rectangular shape in planar view (substantially oval shape in planar view, not shown), and the elastic partition member 44 has long sides extending in the front-rear direction and short sides extending in a direction perpendicular to the long sides. The elastic partition member 44 has a function of absorbing a change in an internal pressure of the primary liquid chamber 1 by elastically deforming in response to the change.

As shown in FIG. 5, the frame member 48 is a member that holds the partition member 41. The frame member 48 includes a fixing flange portion 48b and a holding portion 48a extending up from the fixing flange portion 48b and having a peripheral wall-shape. The fixing flange portion 48b and the holding portion 48a are press-fitted into and fixed to the inner surface 21b of the lower portion of the outer tubular part 21. The partition member 41 (mainly the lower holder 43) is held inside the fixing flange portion 48b and the holding portion 48a. A distal end of the holding portion 48a is disposed close to the stepped surface 21e of the outer tubular part 21. The distal end of the holding portion 48a abuts against the lower end portion 30e of the insulator 30.

The diaphragm 3 includes a thin body portion 3a and a seal portion 3b integrally formed on the outer peripheral portion of the thin body portion 3a. The seal portion 3b is attached to an inner peripheral portion of the fixing flange portion 48b.

The above-described vibration-damping unit 40, as shown in FIG. 5, is fixed to the second attachment member 20 in a state where a portion of the front portion 40 a is housed in the housing portion 25f formed in the fixing part 22. As described with reference to FIG. 6, the housing space 25 including the housing portion 25f has the front side distance L2 larger than the rear side distance L1, so that the vibration-damping unit 40 is housed in a state in which a center of the vibration-damping unit 40 is shifted from a center (the axis O1) of the insulator 30 toward the housing portion 25f (the fixing part 22).

In a state in which the vibration-damping unit 40 is attached to the second attachment member 20, a portion of the orifice passage 45 provided in the partition member 41 (a portion of the orifice passage provided at the front side)

is disposed in the housing portion 25f. That is, the portion of the orifice passage 45 requiring relatively larger space can be efficiently disposed in the housing portion 25f. Consequently, this enables securing a larger space (area) for arranging the elastic partition member 44.

Figure 8:
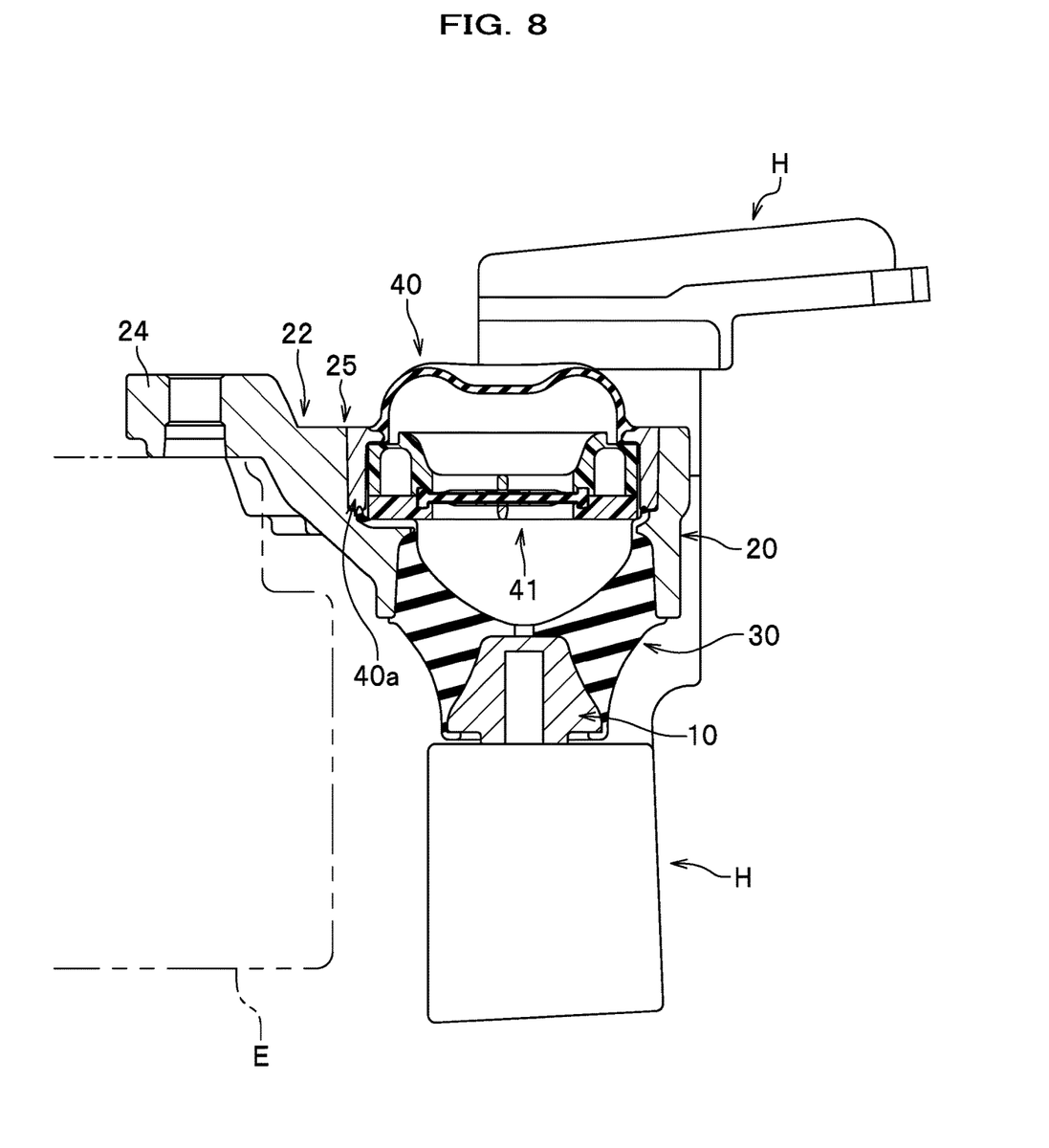
FIG. 8 is a partially cross-sectional view showing a part of the liquid-sealed vibration-damping device attached to a vehicle body.

FIG. 8 shows a usage example of the liquid-sealed vibration-damping device. In the usage example shown in FIG. 8, the liquid-sealed vibration-damping device is brought into a vertical attitude with a shaft thereof (the axis O1 of the insulator 30, see FIG. 5) being aligned in a vertical direction, and at the same time, brought into an upside-down state in which the first attachment member 10 is disposed at the lower side and the second attachment member 20 is disposed at the upper side.

The reference sign H in FIG. 8 indicates a holder to which the liquid-sealed vibration-damping device is fixed. The liquid-sealed vibration-damping device is attached to a frame or other structures on the vehicle body (not shown) through the holder H. The first attachment member 10 of the liquid-sealed vibration-damping device is fastened and fixed to the holder H with bolts (not shown). A heavy object such as an engine E is fastened and fixed to the fixing part 22 of the liquid-sealed vibration-damping device with bolts (not shown).

According to the above-described liquid-sealed vibration-damping device of the present embodiment, a space portion extending to the fixing part 22 (the housing portion 25f) can be also utilized as a portion of the housing space 25 for the vibration-damping unit 40, and thereby, an increase in size and weight of the liquid-sealed vibration-damping device can be prevented. Further, the housing portion 25f can be utilized for enlarging the volume of the orifice passage 45, and thereby, the damping performance can be improved. Furthermore, because the area of the partition member 41 (the area of the elastic partition member 44) of the vibration-damping unit 40 can be enlarged, the spring characteristics of the liquid-sealed vibration-damping device can be set more optionally.

In addition, because the center of the vibration-damping unit 40 (the axis O2) is located at a position nearer the fixing part 22 (the housing portion 25f) than the center of the insulator 30 (the axis O1), correspondingly, the vibration-damping unit 40 can be suppressed from protruding at the opposite side to the fixing part 22, Accordingly, the layoutability can be improved when the liquid-sealed vibration-damping device is mounted on the vehicle.

Further, because a portion of the orifice passage 45 is disposed in the housing portion 25f, the orifice passage 45 requiring a relatively larger space can be disposed space-efficiently. This results in improving the damping performance while preventing the device from being larger and heavier.

Furthermore, because the housing portion 25f accommodates a region that is outside the outer surface 21d of the outer tubular part 21, the housing space 25 (the housing portion 25f) can be effectively secured.

The embodiments of the present invention are described above, but the present invention is not limited to the above-described embodiment and able to be variously modified. For example, the liquid-sealed vibration-damping device may be used in an upright state in which the first attachment member 10 is arranged at the upper side and the second attachment member 20 at the lower side.

Furthermore, the above embodiment is described as including the vibration-damping unit 40 having a substantially rectangular shape, but, the vibration-damping unit 40 is not limited thereto, and can have a various shape such as a circle and square shape. In these cases as well, the housing portion 25f can be included in the housing space 25 for the vibration-damping unit 40.

REFERENCE SIGNS LIST

1: primary liquid chamber
2: secondary liquid chamber
10: first attachment member
20: second attachment member
21: outer tubular part
21d: outer surface
22: fixing part
23: inclined portion
25: housing space
25f: housing portion
30: insulator
40: vibration-damping unit
41: partition member
44: elastic partition member
45: orifice passage

I claim:

1. A liquid-sealed vibration-damping device comprising:
a first attachment member;
a second attachment member;
an insulator connecting the first attachment member with the second attachment member;
a liquid chamber formed to include an inner space of the insulator, wherein hydraulic liquid is sealed in the liquid chamber;
a vibration-damping unit provided with a partition member partitioning the liquid chamber into a primary liquid chamber and a secondary liquid chamber; and
a housing space provided in the second attachment member and housing the vibration-damping unit, wherein
the second attachment member comprises:
an outer tubular part, wherein the insulator is directly fixed to the outer tubular part and wherein a top of the liquid chamber includes a top of the inner space of the insulator and extends over an upper surface of a top of the outer tubular part; and
a fixing part including an inclined portion extending outward and downward from a vertical outer surface of the outer tubular part, wherein
a portion of the housing space enters inside the inclined portion to extend outward beyond the vertical outer surface of the outer tubular part, and thereby an overall length of the housing space in an outward direction in which the inclined portion extends is longer than an overall inner length of the outer tubular part, and
wherein
the vibration-damping unit includes an orifice passage communicating the primary liquid chamber with the secondary liquid chamber; and
a portion of the orifice passage is disposed in the portion of the housing space extending to the fixing part.

2. The liquid-sealed vibration-damping device according to claim 1, wherein the outer tubular part is formed in a tubular shape with a substantially rectangular shape in top view along an axis passing a center of the insulator.

3. The liquid-sealed vibration-damping device according to claim 1, wherein the portion of the housing space extending to the fixing part is formed to include an inner space region that is outside an axis extending along an outer surface of the outer tubular part.

\* \* \* \* \*